United States Patent
Yagyu et al.

(10) Patent No.: US 11,015,657 B2
(45) Date of Patent: May 25, 2021

(54) PARALLEL HYBRID POWER TRANSMISSION MECHANISM

(71) Applicant: KUBOTA CORPORATION, Osaka (JP)

(72) Inventors: Sumio Yagyu, Osaka (JP); Kazuto Okazaki, Osaka (JP)

(73) Assignee: KUBOTA CORPORATION, Osaka (JP)

(*) Notice: Subject to any disclaimer, the term of this patent is extended or adjusted under 35 U.S.C. 154(b) by 358 days.

(21) Appl. No.: 16/003,660

(22) Filed: Jun. 8, 2018

(65) Prior Publication Data
US 2018/0328413 A1 Nov. 15, 2018

Related U.S. Application Data

(63) Continuation of application No. PCT/JP2016/085896, filed on Dec. 2, 2016.

(30) Foreign Application Priority Data

Dec. 11, 2015 (JP) .............................. JP2015-241943

(51) Int. Cl.
*F16D 3/78* (2006.01)
*B60K 6/485* (2007.10)
(Continued)

(52) U.S. Cl.
CPC .................. *F16D 3/78* (2013.01); *B60K 6/26* (2013.01); *B60K 6/40* (2013.01); *B60K 6/48* (2013.01);
(Continued)

(58) Field of Classification Search
CPC ..... F16D 3/78; F16D 1/06; F16D 3/52; B60K 6/485; B60K 6/26; B60K 6/40;
(Continued)

(56) References Cited

U.S. PATENT DOCUMENTS 4,346,773 A * 8/1982 Hofbauer ............... B60K 6/105
180/65.245
9,337,697 B2 * 5/2016 Hirozawa ................ H02K 5/04
(Continued)

FOREIGN PATENT DOCUMENTS

EP 0302118 2/1989
EP 1885046 2/2008
(Continued)

OTHER PUBLICATIONS

Westerhoff, Martin, "Hybrid Drives: This How They Work" VISION Magazine, Nov. 2018, retrieved from the internet Jan. 6, 2021 at <https://www.zf.com/site/magazine/en/articles_11968.html>. (Year: 2018).*
(Continued)

*Primary Examiner* — Greg Binda
(74) *Attorney, Agent, or Firm* — Greenblum & Bernstein, P.L.C.

(57) ABSTRACT

A parallel hybrid power transmission mechanism includes a crank shaft, a driven device to which a power of an engine and/or a motor generator is transmitted, an input shaft disposed on the driven device, a flywheel connected to the crank shaft, and a rotor disposed on the motor generator, including a first connecting portion connected to an outside of the flywheel. The rotor is configured to supply and receive a rotational power to and from the flywheel through the first connecting portion. The parallel hybrid power transmission mechanism further includes a coupling arranged independently from the rotor, including a second connecting portion connected to an inside of the flywheel, the coupling being configured to receive the rotational power of the flywheel through the second connecting portion, and an intermediate shaft connecting the coupling and the input shaft to each
(Continued)

other, the intermediate shaft being configured to transmit the rotational power received by the coupling to the input shaft.

9 Claims, 7 Drawing Sheets (51) Int. Cl.
*F16H 33/02* (2006.01)
*B60K 6/26* (2007.10)
*F16D 1/06* (2006.01)
*F16D 3/52* (2006.01)
*H02K 7/00* (2006.01)
*B60K 6/40* (2007.10)
*B60K 6/48* (2007.10)
*B60K 6/405* (2007.10)

(52) U.S. Cl.
CPC .............. *B60K 6/485* (2013.01); *F16D 1/06* (2013.01); *F16D 3/52* (2013.01); *F16H 33/02* (2013.01); *H02K 7/006* (2013.01); *B60K 6/405* (2013.01); *B60K 2006/4825* (2013.01); *B60Y 2200/92* (2013.01); *Y02T 10/62* (2013.01); *Y10S 903/951* (2013.01)

(58) Field of Classification Search
CPC .. B60K 6/48; B60K 2006/4825; B60K 6/405; F16H 33/02; Y02T 10/62; B60Y 2200/92; Y10S 903/951; H02K 21/14; H02K 7/006
USPC ........ 464/23, 93; 180/65.25, 65.26; 310/113
See application file for complete search history.

(56) References Cited

U.S. PATENT DOCUMENTS

| 9,718,344 B2* | 8/2017 | Wardle ............... F16D 3/06 |
| 10,562,388 B2* | 2/2020 | Yagyu ............... B60K 6/40 |
| 2004/0104630 A1 | 6/2004 | Denner et al. |
| 2008/0087480 A1* | 4/2008 | Tarasinski ........... A01B 59/00 180/65.25 |
| 2010/0056327 A1 | 3/2010 | Hofbauer |
| 2010/0082192 A1 | 4/2010 | Hofbauer |

FOREIGN PATENT DOCUMENTS

| EP | 3157144 A1 | 4/2017 |
| JP | 2001522012 | 11/2001 |
| JP | 2003081189 | 3/2003 |
| JP | 4646983 | 11/2006 |
| JP | 2008290594 | 12/2008 |
| JP | 2009184665 | 8/2009 |
| JP | 2010167956 | 8/2010 |
| JP | 2010221775 | 10/2010 |
| JP | 2010261544 | 11/2010 |
| JP | 2012071731 | 4/2012 |
| JP | 2012512081 | 5/2012 |
| JP | 2014083869 | 5/2014 |
| WO | 9922955 | 5/1999 |

OTHER PUBLICATIONS

International Search Report dated Feb. 14, 2017 in PCT/JP2016/085896.
International Preliminary Report on Patentability dated Jun. 12, 2018 in PCT/JP2016/085896.
Extended European Search Report in EP Appln. No. 16872913.5 dated Aug. 20, 2019.

* cited by examiner

PARALLEL HYBRID POWER TRANSMISSION MECHANISM

CROSS-REFERENCE TO RELATED APPLICATIONS

The present application is a continuation application of International Application No. PCT/JP 2016/085896, filed Dec. 2, 2016, which claims priority to Japanese Patent Application No. 2015/241943, filed Dec. 11, 2015. The contents of these applications are incorporated herein by reference in their entirety.

FIELD OF THE INVENTION

The present invention relates to a parallel hybrid power transmission mechanism for transmitting power of a combination of a motor generator and an engine.

DISCUSSION OF THE BACKGROUND

In a parallel hybrid power transmission system combining a motor generator and an engine, as conventionally disclosed in Japanese Unexamined Patent Application Publication No. 2010-261544 and Japanese Unexamined Patent Application Publication No. 2014-83869, the power is transmitted by connecting devices in the order of the crankshaft of the engine, the rotor of the motor generator, and the input shaft of the driven device. In this manner, (1) the power of the engine is transmitted to the driven device through the rotor of the motor generator, and (2) the power of the motor generator is directly transmitted from the rotor to the driven device. That is, the two motive power is transmitted through the rotor of the motor generator.

In the conventional art, both of the power of the motor generator and the power of the crankshaft of the engine are transmitted to the driven device through the rotor of the motor generator. In this manner, the rotor is responsible for two power transmission, and the load applied to the rotor is increased.

In addition, although a hydraulic pump is frequently used as the driven device in the industrial machinery, the hydraulic pump generates a large torque fluctuation depending on fluctuations of a required power. In the conventional art, torsional vibrations of the power transmission system depending on the torque fluctuation may be transmitted to the engine under the state where the clutch device is in a connected state.

Also, when the torsional vibration mentioned above is applied to the rotor, a rotation signal from a rotation detector (a resolver) provided on the rotor will vibrate because the vector control is used for driving the motor generator. As the result, the control of the motor inverter becomes unstable, and there is a possibility to cause the step out and difficulty in the power control.

Japanese Patent Publication No. 4646983 discloses a generator motor configured to support the rotor rotatably on the motor housing and to connect the flywheel and the rotor to each other by a cylindrical shaft portion in the spline-coupling manner. However, there arises a problem that the torsional vibrations and the like due to the fluctuating torque propagated from the driven device (the hydraulic pump and the like) are transmitted to the rotor through the spline coupling. That is, the technique disclosed in Japanese Patent Publication No. 4646983 is incapable of avoiding the influence of torsional vibrations or the like on the rotor, the torsional vibrations being generated by the fluctuating torque propagated from the driven device.

In addition, in the hybrid system disclosed in Japanese Unexamined Patent Application Publication No. 2008-290594, the output shaft of the engine, the flywheel, the rotor of the motor generator, and the rotation shaft of the hydraulic pump are connected in series. That is, the power transmission system configured to transmit the power of the engine from the flywheel to the rotor and the other power transmission system configured to transmit the power of the engine from the flywheel to the hydraulic pump are not independent (separated) from each other. In this manner, there arises a problem that the torsional vibrations due to the fluctuating torque propagated from the hydraulic pump are transmitted to the rotor through the hollow shaft.

In addition, in the power transmission mechanism disclosed in Japanese Unexamined Patent Application Publication No. 2009-184665, the rotor and the elastic joint are integrally connected to the rotating body. Thus, the power transmission system configured to transmit the power of the engine from the flywheel to the rotor and the other power transmission system configured to transmit the power of the engine from the flywheel to the power takeoff shaft through the elastic coupling both pass through the rotating body. That is, similar to the technique disclosed in Japanese Unexamined Patent Application Publication No. 2008-290594, the two power transmission systems are not independent (separated) from each other. Thus, there arises a problem that the torsional vibrations or the like due to the fluctuating torque propagated from the power takeoff shaft are transmitted to the rotor through the rotating body.

In addition, in the power transmission mechanism disclosed in Japanese Unexamined Patent Application Publication No. 2003-81189, the input shaft of the driven device is directly connected to a damper arranged on the inner side (the inner circumferential side) of the rotor. In this manner, in order to connect the input shaft to the damper, it is necessary for the damper to be inserted deeply into the inside of the rotor, and thus the input shaft has to be protruded long. As the result, the input shaft that protrudes long is directly connected to the damper formed of an elastic material or the like, and thus it is difficult for the input shaft to be firmly connected to the damper while suppressing the misalignment and vibration of the core during the rotations. Thus, there is a possibility that the power cannot be smoothly transmitted from the engine to the driven device.

In addition, in the power transmission mechanism disclosed in Japanese Unexamined Patent Application Publication No. 2012-71731, the crankshaft, the flywheel, the damper device, the rotor, and the output shaft of the engine are connected in series. That is, similar to the technology disclosed in Japanese Unexamined Patent Application Publication No. 2008-290594 and Japanese Unexamined Patent Application Publication No. 2009-184665, the power transmission system configured to transmit the power of the engine from the flywheel to the rotor and the power transmission system configured to transmit the power of the engine from the flywheel to the output shaft are not independent (separated) from each other. As the result, there arises a problem that the torsional vibrations or the like due to the fluctuating torque propagated from the output shaft is transmitted to the rotor through the output rotor.

SUMMARY OF THE INVENTION

A parallel hybrid power transmission mechanism includes an engine, a crank shaft disposed on the engine, a motor generator, a driven device to which a power of the engine and/or the motor generator is transmitted, an input shaft disposed on the driven device, a flywheel connected to the crank shaft and configured to be rotated, a rotor disposed on the motor generator, including a first connecting portion connected to an outside of the flywheel in a radial direction, the rotor being configured to supply and receive a rotational power to and from the flywheel through the first connecting portion, a coupling arranged independently from the rotor, including a second connecting portion connected to an inside of the flywheel in the radial direction, the coupling being configured to receive the rotational power of the flywheel through the second connecting portion, and an intermediate shaft connecting the coupling and the input shaft to each other, the intermediate shaft being configured to transmit the rotational power received by the coupling to the input shaft.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings. The drawings are to be viewed in an orientation in which the reference numerals are viewed correctly.

Embodiments of the present invention will be described below with reference to the drawings.

Figure 1:
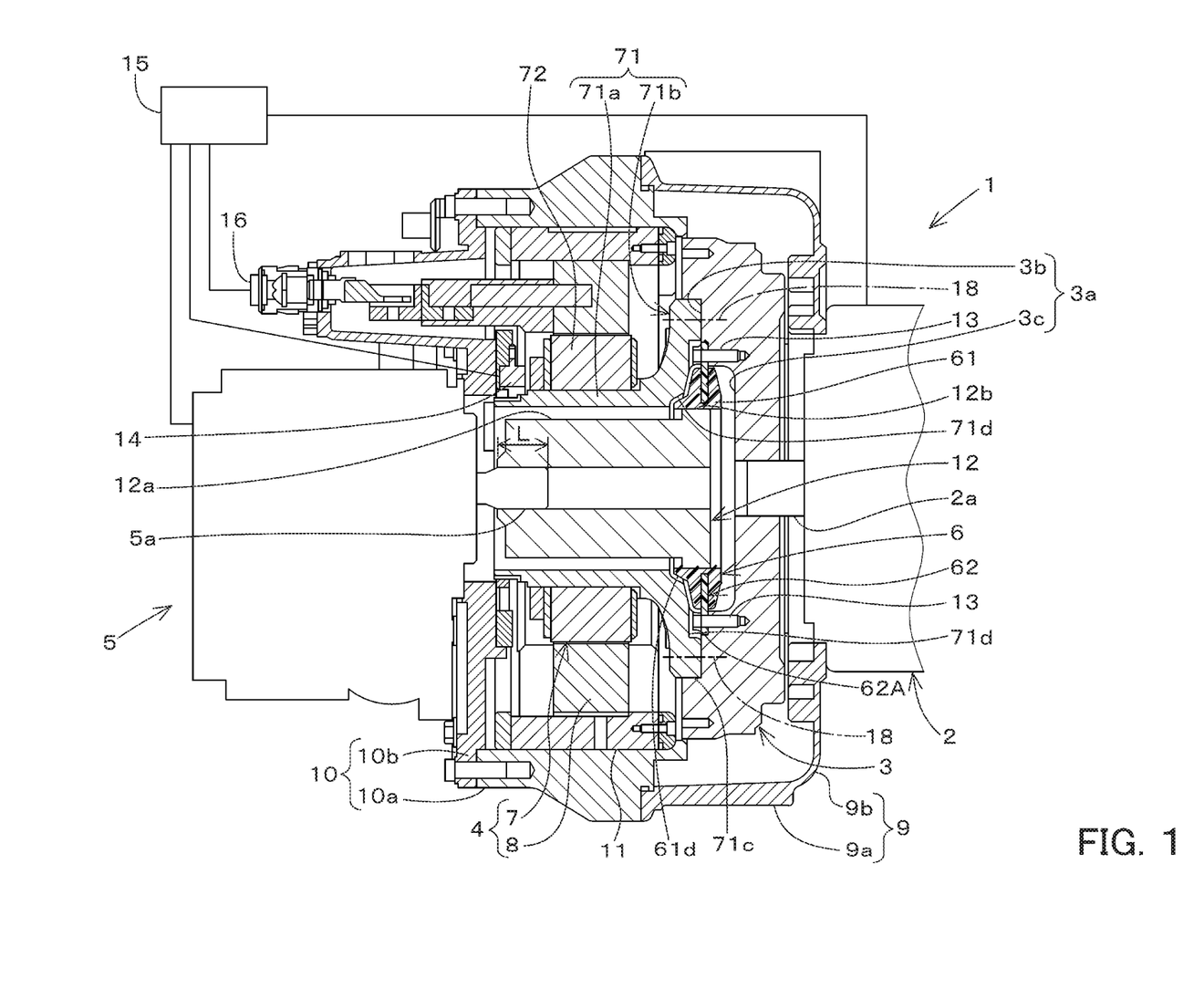
FIG. 1 is a cross-sectional view illustrating one example of a parallel hybrid power transmission mechanism according to an embodiment of the present invention.

FIG. 1 is a cross-sectional view showing an example of a parallel hybrid power transmission mechanism 1 (hereinafter simply referred to as a power transmission mechanism 1) according to an embodiment of the present invention. The power transmission mechanism 1 is applied to an industrial machine such as an agricultural machine, a construction machine, a utility vehicle, and the like.

The power transmission mechanism 1 includes an engine 2, a flywheel 3, a motor generator 4, a driven device 5, and a coupling 6. The power transmission mechanism 1 transmits the power of the engine 2 and the power of the motor generator 4 alternately or in combination to the driven device 5.

In the following description, the direction extending from the engine 2 to the driven device 5 (the left direction in FIG. 1) will be referred to as one direction, and the direction extending from the driven device 5 to the engine 2 (the right direction in FIG. 1) will be referred to as the other direction.

The engine 2 is a diesel engine, a gasoline engine, or the like. The engine 2 is provided with a crankshaft 2a. The crankshaft 2a projects toward the driven device 5 side (one end side). A flywheel 3 is connected to a tip end (one end side) of the crankshaft 2a.

The flywheel 3 has a substantially disk shape, and is formed of a material having a large mass (for example, a metal such as cast iron). A crankshaft 2a of the engine 2 is connected to the center of the flywheel 3. The flywheel 3 has a first concave portion 3a on a surface opposite to the engine 2 (on the one end side). The first concave portion 3a has a large-diameter concave portion 3b (an annular concave portion) and a small-diameter concave portion 3c, the large-diameter concave portion 3b being recessed in an annular shape, the small-diameter concave portion 3c being recessed deeper than the large-diameter concave portion 3b. The large-diameter concave portion 3b and the small-diameter concave portion 3c are formed concentrically each other, and the large-diameter concave portion 3b is provided on the radially outer side of the small-diameter concave portion 3c.

The flywheel 3 is surrounded by a flywheel housing 9. The flywheel housing 9 has an outer circumferential portion 9a and a side wall 9b. The outer circumferential portion 9a is provided on the radially outer side of the flywheel 3. A motor housing 10 described later is fixed to an end portion of the outer circumferential portion 9a on the engine 2 side and to an end side of the opposite side (the one end side). The side wall 9b is provided at the end portion of the outer circumferential portion 9a on the engine 2 side. The flywheel 3 is arranged in an internal space surrounded by the outer circumferential portion 9a and the side wall 9b. The side wall 9b is fixed to the engine 2.

The motor generator 4 is disposed on one end side of the flywheel 3. The motor generator 4 has a rotor 7 and a stator 8. As the motor generator 4, a three-phase AC synchronous motor of a permanent-magnet embedded type is preferably employed. However, another type of synchronous motor may be employed as the motor generator 4. For example, a synchronous motor in which a laminated steel plate is fitted to the rotor 7, the laminated steel plate on which a coil wound around, or the like may be employed. In addition, the motor generator 4 may be an AC motor or a DC motor.

The rotor 7 provided in the motor generator 4 has a rotor boss 71 and a rotor main body 72. In addition, the rotor 7 has a first connecting portion 71c connected to the radially outer side of the flywheel 3. In the case where the motor generator 4 functions as an electric-power generator, the rotor 7 receives the rotational power of the flywheel 3 through the first connecting portion 71c. On the other hand, in the case where the motor generator 4 functions as an electric motor, the rotor 7 provides the rotational power to the flywheel 3 through the first connecting portion 71c. That is, the rotor 7 receives and provides the rotational power with respect to the flywheel 3 through the first connecting portion 71c.

The first connecting portion 71c is provided on the side radially outer than the second connecting portion 62A described below, and is isolated (separated) from the second connecting portion 62A. In the embodiment, the extending portion 71c described below is the first connecting portion 71c.

The rotor boss 71 has a hollow shape (a cylindrical shape) as a whole, and has a cylindrical portion 71a and a flange portion 71b. A rotor main body 72 is fitted on the outer circumference of the cylindrical portion 71a. The flange portion 71b is provided at the end portion of the rotor boss 71 on the flywheel 3 side, and extends in the radially outward direction. The flange portion 71b has an extending portion 71c and a second concave portion 71d. The second concave portion 71d is provided on the end face of the flange portion 71b on the flywheel 3 side, and is annularly recessed toward the side opposite to the flywheel 3. The shape of the second concave portion 71d corresponds to the shape of the projecting portion 61d (described later) of the coupling 6, the coupling 6 being opposed to the second concave portion 71d. The extending portion 71c is provided on the radially outer side of the second concave portion 71d (on the radially outer side of the coupling 6), and is connected to the flywheel 3. In particular, the extending portion 71c is fitted into the large diameter concave portion (an annular concave portion) 3b of the first concave portion 3a of the flywheel 3, and is connected to the flywheel 3. In the present embodiment, the extending portion 71c and the flywheel 3 are connected to each other by a connecting tool 18 such as a bolt. Meanwhile, it should be noted that the connecting tool 18 is located at a position shifted from the cross section shown in FIG. 1 in the circumferential direction of the flywheel 3, and is not shown in FIG. 1. Thus, for convenience of the explanation, the position in the radial direction of the connecting tool 18 is indicated by a chain line in FIG. 1.

According to the configuration mentioned above, the rotor 7 is connected to the flywheel 3 at the extending portion 71c located on the radially outer side of the flywheel 3. That is, in the present embodiment, the extending portion 71c of the rotor boss 71 is the first connecting portion 71c configured to connect the rotor 7 to the radially outer side of the flywheel 3.

However, the configuration of the first connecting portion 71c is not limited to the configuration of the present embodiment. That is, the first connecting portion 71c is a portion connecting the rotor 7 to the radially outer side of the flywheel 3. Thus, it is required for the first connecting portion 71c to be disposed on the radially outer side of the second connecting portion 62A described later under the state isolated (separated) from the second connecting portion 62A.

The rotor main body 72 has an iron core (a laminated steel plate or the like) in which a permanent magnet is embedded. The rotor main body 72 is arranged on one end side of the flange portion 71b, and is opposed to the stator 8. The rotor main body 72 rotates integrally with the rotor boss 71 around the center axis of the rotor boss 71.

The motor housing 10 has a cylindrical portion 10a and a cover 10b, the cylindrical portion 10a surrounding the outer circumference of the motor generator 4, the cover 10b being provided on one end side of the motor generator 4. An end portion of the outer circumferential portion 9a of the flywheel housing 9 on one end side (on the left side in FIG. 1) is fixed to an end portion of the cylindrical portion 10a on the other side (on the right side in FIG. 1). A pump housing (described later) of the driven device 5 is connected to the cover 10b. The stator 8 is fixed to the inner circumferential surface of the cylindrical portion 10a of the motor housing 10.

The stator 8 is formed of, for example, a laminated steel plate and has a coil wound thereon. A water jacket 11 is interposed between the inner circumferential surface of the cylindrical portion 10a and the stator 8. The water jacket 11 is provided with a passage for allowing a refrigerant to pass therethrough. A rotor 7 is disposed on the radially inner side of the stator 8. The internal space of the motor housing 10 is opposed to and communicated with the internal space of the flywheel housing 9.

The driven device 5 is driven by receiving the power from the engine 2 and/or the motor generator 4. The driven device 5 is, for example, a hydraulic pump, and more specifically, a hydraulic pump of a hydrostatic transmission can be exemplified. The driven device 5 is connected to the cover 10b of the motor housing 10 through a pump housing. The input shaft 5a provided on the driven device 5 extends toward the other end side (the right side in FIG. 1). The input shaft 5a is connected to the coupling 6 through the intermediate shaft 12. That is, the intermediate shaft 12 connects the input shaft 5a of the driven device 5 and the coupling 6 to each other.

The intermediate shaft 12 is disposed concentrically in the rotor boss 71a having a hollow-shape. The intermediate shaft 12 is formed of a rigid material such as metal. The intermediate shaft 12 has a substantially cylindrical shape, and has a small diameter portion 12a and a large diameter portion 12b. The small diameter portion 12a is formed on one end side (on the driven device 5 side) of the intermediate shaft 12, and the large diameter portion 12b is formed on the other end side (on the engine 2 side) of the intermediate shaft 12. The axial length of the intermediate shaft 12 is substantially equal to the axial length of the rotor boss 71. One end (the left end in FIG. 1) of the intermediate shaft 12 is positioned slightly shifting to the other end side (to the right side in FIG. 1) from the one end (the left end in FIG. 1) of the rotor boss 71, and the other end (the right end in FIG. 1) of the intermediate shaft 12 is positioned slightly shifting to the other end side from the other end (the right end in FIG. 1) of the rotor boss 71. The other end of the intermediate shaft 12 is positioned within the small-diameter concave portion 3c of the first concave portion 3a of the flywheel 3.

The input shaft 5a of the driven device 5 is connected to the inside of one end side (to the left side in FIG. 1) of the intermediate shaft 12. In the present embodiment, the connection between the intermediate shaft 12 and the input shaft 5a is made in the spline coupling method. The connection length L of the input shaft 5a to the intermediate shaft 12 is about one-third of the length of the intermediate shaft 12. In other words, in the axial direction, the position of the end portion of the input shaft 5a on the other end side is substantially same with the position of one end of the rotor main body 72.

A clearance is formed between the outer circumferential surface of the small diameter portion 12a of the intermediate shaft 12 and the inner circumferential surface of the rotor boss 71. A large number of teeth (hereinafter referred to as external teeth) are formed along the outer circumferential surface of the large diameter portion 12b. The external teeth are engaged with internal teeth (described later) formed on the coupling 6. In this manner, the intermediate shaft 12 and the coupling 6 are connected to each other.

As shown in FIG. 2 to FIG. 4A, the coupling 6 has a hub 61 and a disk 62. In addition, the coupling 6 has a second connecting portion 62A connected to a radially inner side of the flywheel 3. The coupling 6 receives the rotational power of the flywheel 3 through the second connecting portion 62A. The second connecting portion 62A is provided on the side radially inner than the first connecting portion 71c, and is isolated (separated) from the first connecting portion 71c. In the present embodiment, the outer portion 62A described below is the second coupling portion 62A.

Figure 2:
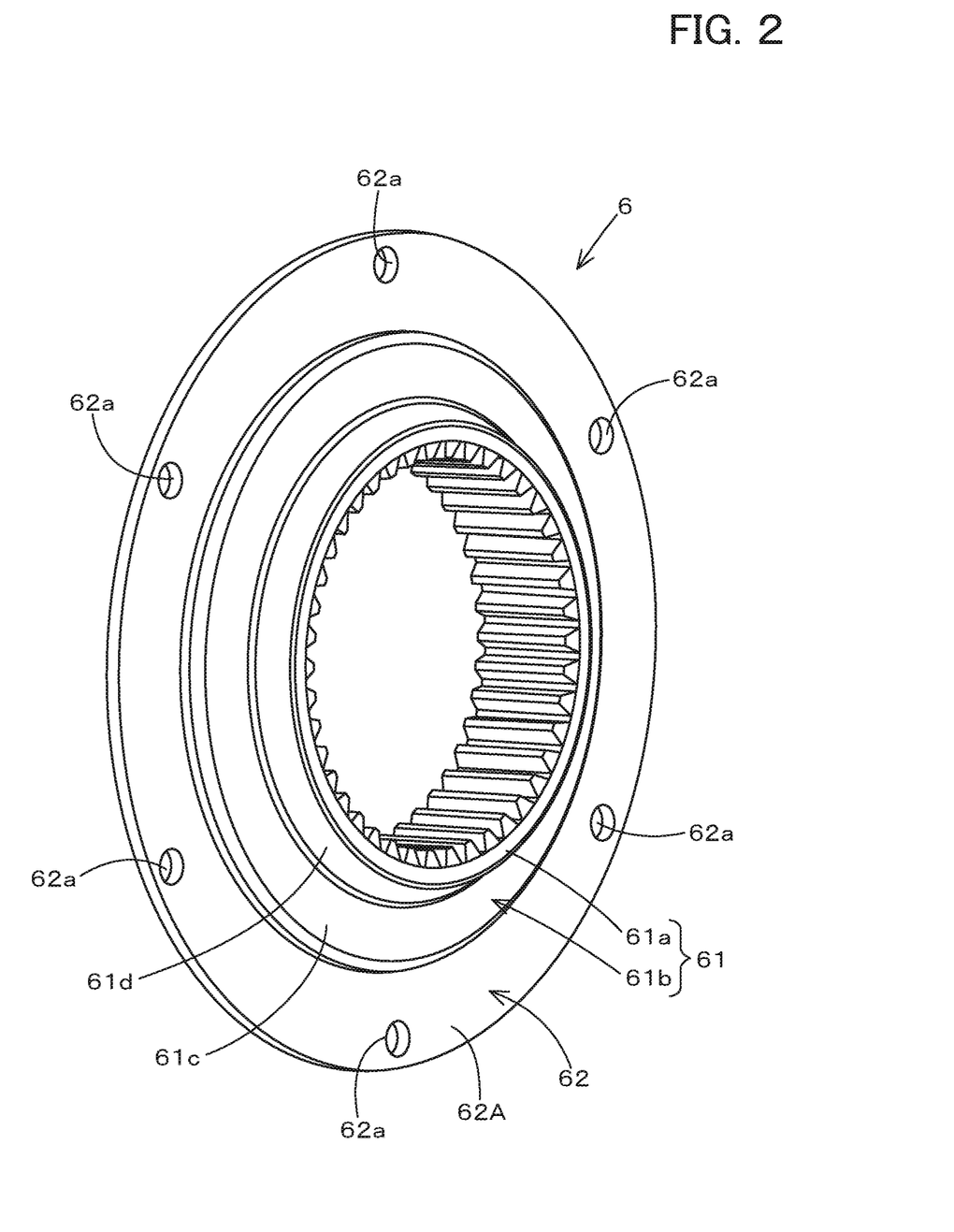
FIG. 2 is a perspective view illustrating a coupling according to the embodiment.
Figure 3:
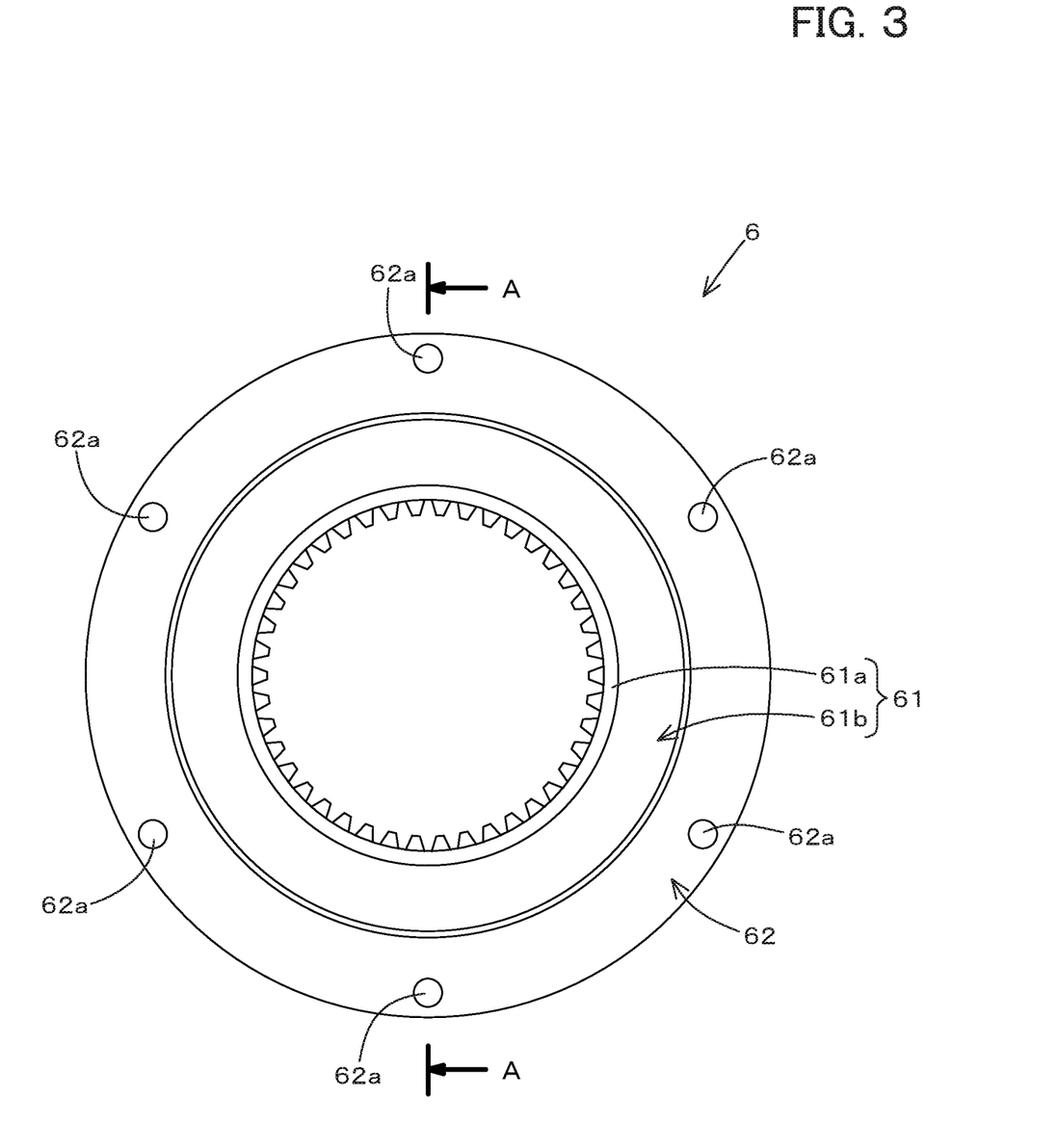
FIG. 3 is a plan view illustrating the coupling according to the embodiment.
Figure 4A:
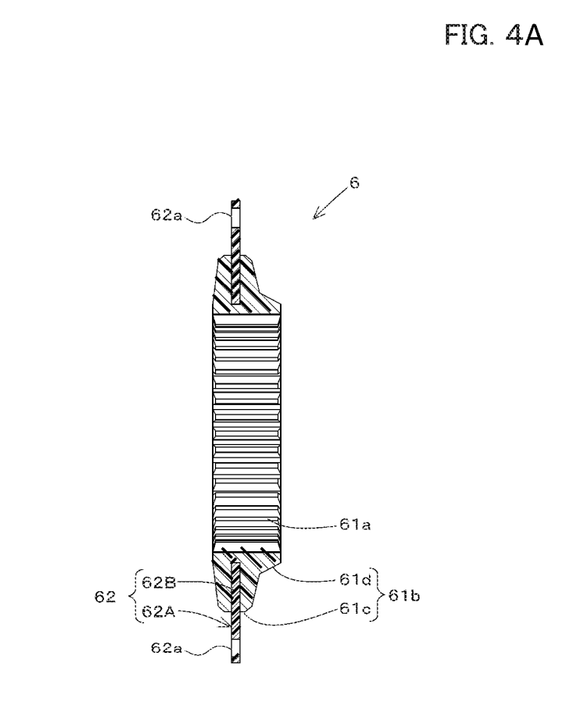
FIG. 4A is a view illustrating an A-A cross section of FIG. 3.

The hub 61 is connected to the intermediate shaft 12, and the disk 62 is connected to the flywheel 3. In this manner, the coupling 6 connects the intermediate shaft 12 and the flywheel 3 to each other.

As shown in FIG. 1, the hub 61 is arranged in a space formed between the second concave portion 71d of the rotor boss 71 and the first concave portion 3a of the flywheel 3. In this manner, since the coupling 6 is disposed close to the rotor boss 71 and the flywheel 3, the power transmission mechanism 1 can be configured compactly.

The hub 61 has an inner diameter portion 61a and an outer diameter portion 61b. The inner diameter portion 61a and the outer diameter portion 61b are formed of a flexible material such as resin and rubber. The plastic (the synthetic resin) is preferably employed as the resin, and in particular, fiber reinforced plastic such as carbon fiber reinforced polyamide is suitably employed. In addition, the nylon (a registered trade mark), the polyester, the polyurethane and the like can be employed.

The inner diameter portion 61a has a cylindrical shape, and forms a number of teeth (hereinafter referred to as internal teeth) along the inner circumferential surface. The internal teeth are engaged with the external teeth formed on the outer circumferential surface of the large diameter portion 12b of the intermediate shaft 12. In this manner, the coupling 6 is connected to the tip end (end portion on the other end side) of the intermediate shaft 12. Since the coupling is made by the engagement between the internal teeth and the external teeth, the power can be securely transmitted from the coupling 6 to the intermediate shaft 12. In addition, the rotation accuracy of the intermediate shaft 12 can be maintained high.

Here, the internal teeth or the external teeth are the curving teeth (the curved-teeth). In particular, the internal teeth or the external teeth are curved so as to have an arcuate bulge in the tooth width direction. In this manner, the misalignment (the vibration of the core or the like) in the axial direction, in the radial direction, and in the angular direction between the input shaft 5a, the intermediate shaft 12, and the flywheel 3 can be absorbed.

The outer diameter portion 61b is formed in an annular shape, and is provided on the radially outer side of the inner diameter portion 61a. The outer diameter portion 61b has an outer annular portion 61c and a projecting portion 61d, the outer annular portion 61c having an annular shape and extending radially outward, the projecting portion 61d protruding toward the rotor boss 71 side. The projecting portion 61d projects in a truncated cone shape so that the amount of projection increases as it goes toward the radially inner side of the outer diameter portion 61b. The projecting portion 61d is arranged in the second concave portion 71d of the rotor boss 71. However, the projecting portion 61d and the second concave portion 71d are not connected to each other, and the coupling 6 and the rotor 7 (the rotor boss 71) are not connected to each other. That is, the coupling 6 and the rotor 7 are independent from each other. In other words, the coupling 6 and the rotor 7 are isolated from each other. Thus, the rotational power of the coupling 6 is not transmitted to the rotor 7. In addition, the rotational power of the rotor 7 is not directly transmitted to the coupling 6.

The coupling 6 and the rotor 7 may be in contact with each other, or they may be slightly separated from each other. In the case where the coupling 6 and the rotor 7 are in contact with each other, it is possible to accurately and easily position the coupling 6 with respect to the rotor 7. In addition, the outer diameter portion 61b formed of a flexible material such as a resin exhibits a lubricating action. Thus, the abrasion of the contacting portion between the coupling 6 and the rotor 7 can be suppressed, and the lubricating oil is not required to be supplied to the abutting portion. In this manner, it is possible to simplify the maintenance.

The disk 62 is formed of a plate having an annular and ring shape, and is formed of a rigid material such as metal in the present embodiment. As shown in FIG. 4A, the disk 62 has an outer portion 62A disposed on the radially outer side of the disk 62 and an inner portion 62B disposed on the radially inner side. The outer portion 62A protrudes radially outward from the outer annular portion 61c of the outer diameter portion 61b of the hub 61. The outer portion 62A is connected to the large-diameter concave portion 3b of the flywheel 3 as described later. The inner portion 62B is embedded in the outer diameter portion 61b of the hub 61.

As shown in FIG. 3, a plurality of through holes 62a are formed at equal intervals in the circumferential direction on the outer portion 62A of the disk 62. Connecting tools such as bolts 13 are inserted through the plurality of through holes 62a. The connecting tool 13 is arranged on the radial inner side of the flywheel 3 with respect to the connecting tool 18 and at a position different from the connecting tool 18 in the circumferential direction. The connecting tool 13 is screwed into a screw hole formed on the radially inner side of the large-diameter concave portion 3b of the flywheel 3, and thereby to connect the disk 62 and the flywheel 3 to each other. In this manner, the outer portion 62A of the disk 62 of the coupling 6 is connected to the flywheel 3 on the radially inner side of the flywheel 3. That is, in the present embodiment, the outer portion 62A of the disk 62 is the second connecting portion 62A connecting the coupling 6 to the radially inner side of the flywheel 3.

However, the configuration of the second connecting portion 62A is not limited to the configuration of the present embodiment. That is, the second connecting portion 62A is a portion that connects the coupling 6 to the radially inner side of the flywheel 3, and it is required for the second connecting portion 62A to be disposed on the radially inner side of the first connecting portion 71c under the state isolated (separated) from the first connecting portion 71c.

Figure 4B:
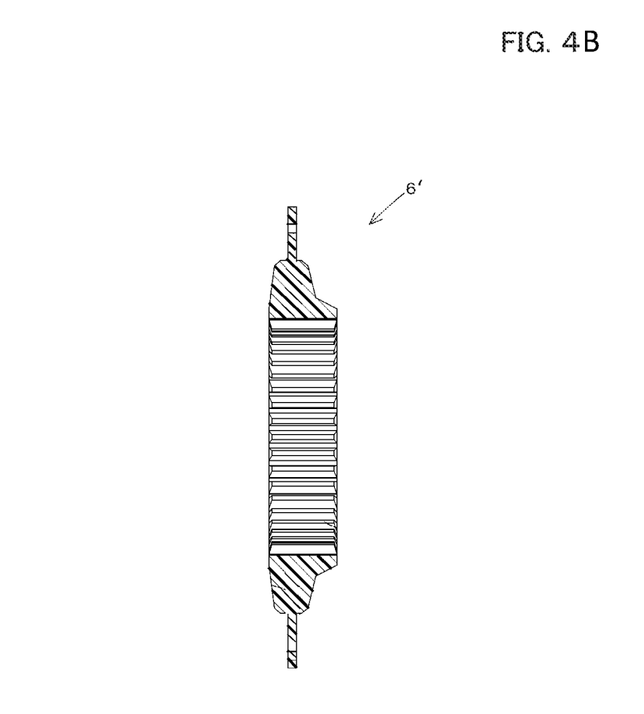
FIG. 4B is a cross section view of a coupling according to another embodiment.

In another embodiment of the coupling 6, both of the hub 61 and the disk 62 may be formed of a flexible material such as resin or rubber. In that case, it is preferable to form the hub 61 and the disk 62 integrally with the same flexible material, for example as shown with coupling 6' in FIG. 4B. The plastic (the synthetic resin) is suitable as the resin, and for example, the fiber reinforced plastic such as the nylon (a registered trade mark), the polyester, the polyurethane, the carbon fiber reinforced polyamide, or the like is suitably employed.

The coupling 6 is radially positioned in the radial direction with respect to the flywheel 3. In other words, the coupling 6 is positioned so that the center axis of the coupling 6 is concentric with the center axis of the flywheel 3.

The coupling 6 connects the input shaft 5a of the driven device 5 and the flywheel 3 to each other by the intermediate shaft 12. In this manner, the coupling 6 provides the function of transmitting the power from the flywheel 3 to the intermediate shaft 12. In addition, since the coupling 6 has the portion (the hub 61, or the hub 61 and the disk 62) formed of the flexible material, the coupling 6 can buffer or absorb the impact and torsional vibrations and the like caused by the torque fluctuation propagated from the intermediate shaft 12 to the flywheel 3 side. Further, since the internal teeth or the external teeth are the curved-teeth, the misalignment (the vibration of the core or the like) in the axial direction, in the radial direction, and in the angular direction between the input shaft 5a, the intermediate shaft 12, and the flywheel 3 can be absorbed.

In addition, the flywheel 3 is connected to the driven device 5 by the coupling 6 and the intermediate shaft 12. That is, the connection between the flywheel 3 and the driven device 5 is not a connection using the rotor 7 but a connection not using the rotor 7. Thus, the flywheel 3 and the driven device 5 are linearly connected, and thus the distance between the flywheel 3 and the driven device 5 can be shortened. In this manner, it possible to configure the power transmission mechanism 1 compactly.

In addition, the rotor 7 is not directly connected to the driven device 5 but is connected to the driven device 5 by a flywheel 3 having a large inertial force and a coupling 6 including a flexible material. Thus, the torsional vibrations due to variable torques from the driven device 5 is cut off, and the torsional vibration or the like is not transmitted to the engine 2 and the motor generator 4.

The power transmission mechanism 1 further includes a rotation detector 14 and a controller 15. The rotation detector 14 is configured to detect the rotation phase of the rotor 7. A resolver, an encoder, or the like is employed as the rotation detector 14. In the power transmission mechanism 1 for the industrial machines (the agricultural machines, the construction machines, and the like), a resolver having an excellent environmental resistance and having a good angle detection accuracy is suitably used. The rotation detector 14 is arranged between the cover 10b of the motor housing 10 and the rotor main body 72, and is in proximity to the outer circumferential surface of the cylindrical portion 71a of the rotor boss 71. The rotation detector 14 is connected to the controller 15.

The controller 15 includes an inverter configured to perform the vector-control for the motor generator 4. The controller 15 is connected to the motor generator 4 by a power cable connecting portion 16 and the like. In addition, the controller 15 is also connected to the engine 2, the driven device 5, and the like. The controller 15 controls the driving, the stopping, and the rotation speed of the engine 2, the motor generator 4, the driven device 5, and the like.

Figure 5:
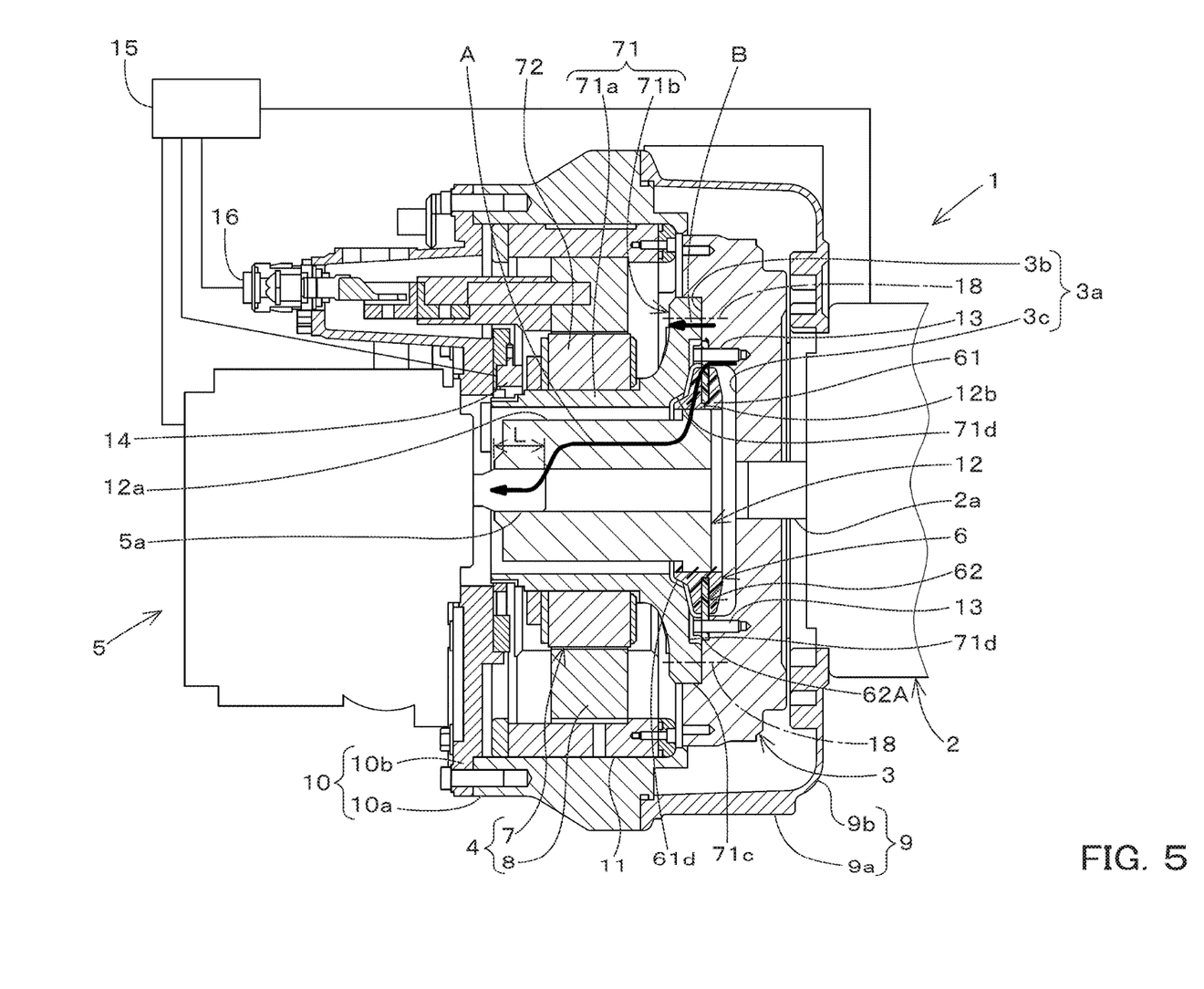
FIG. 5 is a view explaining a first power transmission system and a second power transmission system according to the embodiment.

The power transmission mechanism 1 includes two power transmission systems (the power transmission parts) configured to transmit the rotational power of the flywheel 3. One of the power transmission systems (referred to as a first power transmission system) includes the flywheel 3, the second connecting portion 62A, the coupling 6, the intermediate shaft 12, and the driven device 5. As indicated by an arrowed line A in FIG. 5, the first power transmission system transmits the rotational power of the flywheel 3 to the coupling 6 through the second coupling portion 62A, and transmits the rotational power from the coupling 6 to the input shaft 5a of the driven device 5 through the intermediate shaft 12. The other one of the power transmission systems (referred to as a second power transmission system) includes the flywheel 3, the first connecting portion 71c, and the rotor 7. As indicated by an arrowed line B in FIG. 5, the second power transmission system transmits the rotational power of the flywheel 3 directly to the rotor 7 through the first connecting portion 71c. That is, the first power transmission system and the second power transmission system are independent (separated) from each other, and thus the power transmission systems are configured to transmit the power through separated paths.

Next, the operation of the power transmission mechanism 1 will be described below.

In the power transmission mechanism 1, when the engine 2 is driven, the rotational power of the engine 2 is transmitted to the flywheel 3 through the crankshaft 2a, and rotates the flywheel 3. As indicated by an arrowed line C in FIG. 6, the rotational power of the flywheel 3 is transmitted from the coupling 6 to the intermediate shaft 12, and then is transmitted from the intermediate shaft 12 to the input shaft 5a of the driven device 5. That is, the rotational power of the flywheel 3 generated by the driving of the engine 2 is transmitted to the driven device 5 through the first power transmission system.

Figure 6:
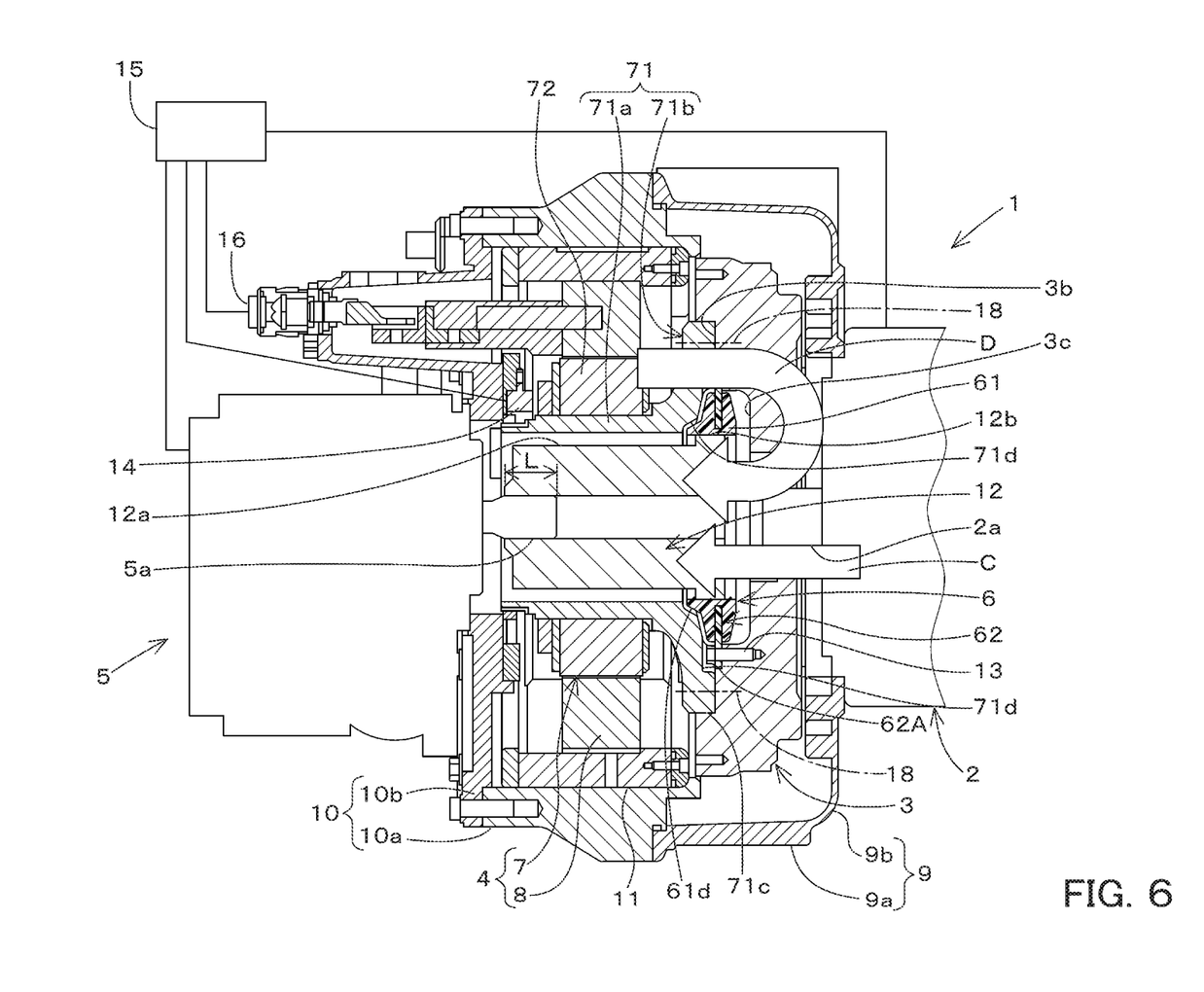
FIG. 6 is a view explaining a power transmission path from an engine and another power transmission path from a motor generator according to the embodiment.

In addition, simultaneously with the driving of the driven device 5, the rotational power of the flywheel 3 is transmitted to the rotor 7 through the rotor boss 71 and activates the motor generator 4 as a generator. That is, the rotational power of the flywheel 3 is transmitted to the rotor 7 through the second power transmission system.

During the power transmission by the second power transmission system, the rotational power of the engine 2 is transmitted to the rotor 7 through the flywheel 3. However, the rotor 7 is not connected to the input shaft 5a of the driven device 5. Thus, the driven device 5 is not a load of the rotation of the rotor 7, and the rotor 7 is free from the influence of the load variation transmitted from the driven device 5.

On the other hand, when the motor generator 4 is driven in addition to the driving of the engine 2, the rotor 7 rotates. As indicated by an arrowed line D in FIG. 6, the rotational power of the rotor 7 is transmitted from the flywheel 3 to the intermediate shaft 12 through the coupling 6, and then transmitted from the intermediate shaft 12 to the input shaft 5a of the driven device 5. That is, the rotational power of the rotor 7 is transmitted to the driven device 5 through the second power transmission system. By the rotational power generated by the driving of the motor generator 4, the power transmitted from the engine 2 to the driven device 5 through the first power transmission system is assisted. That is, the driven device 5 is driven by the combined power of the power from the first power transmission system and the power from the second power transmission system.

As described above, the first power transmission system configured to transmit the power from the flywheel 3 to the driven device 5 and the second power transmission system configured to transmit the power from the flywheel 3 to the rotor 7 are independent from each other. In this manner, the power of the engine 2 is transmitted from the flywheel 3 to the driven device 5 without passing through the rotor 7, and thus the first power transmission system and the second power transmission system do not interfere with each other.

If there is a torque fluctuation due to a change of required power while the driven device 5 is being driven, the impact, the torsional vibrations, or the like occurs in the first power transmission system. The torsional vibrations and the like are propagated from the input shaft 5a of the driven device 5 to the intermediate shaft 12. However, the torsional vibrations or the like is buffered and absorbed by the coupling 6, and is cut off by the inertia force of the flywheel 3. Thus, propagation of the impact, the torsional vibration, and the like is greatly reduced, and thus the engine 2 and the rotor 7 are free from the influence the load variation transmitted from the driven device 5.

The torsional vibrations propagated from the driven device 5 to the rotor 7 is buffered, absorbed, and isolated, and thereby the rotation detector 14 provided on the rotor 7 can generate a rotation signal free from the vibrations. Thus, the vector control for driving the motor generator 4 through the controller 15 can be stably and accurately performed, and it is possible to prevent the power control from being disabled due to the step out.

In addition, since the coupling 6 has the portion (the hub 61, or the hub 61 and the disk 62) formed of a flexible material such as a resin, the torsional vibrations mentioned above can be absorbed.

In addition, the intermediate shaft 12 is connected to the input shaft 5a of the driven device 5, and the intermediate shaft 12 is connected to the flywheel 3 by the coupling 6. In the case where the disk 62 of the coupling 6 is formed of a rigid material, it is possible to perform the connection between the flywheel 2 and the coupling 6 with high precision, and it is possible to improve the rotation accuracy of the intermediate shaft 12.

Figure 7:
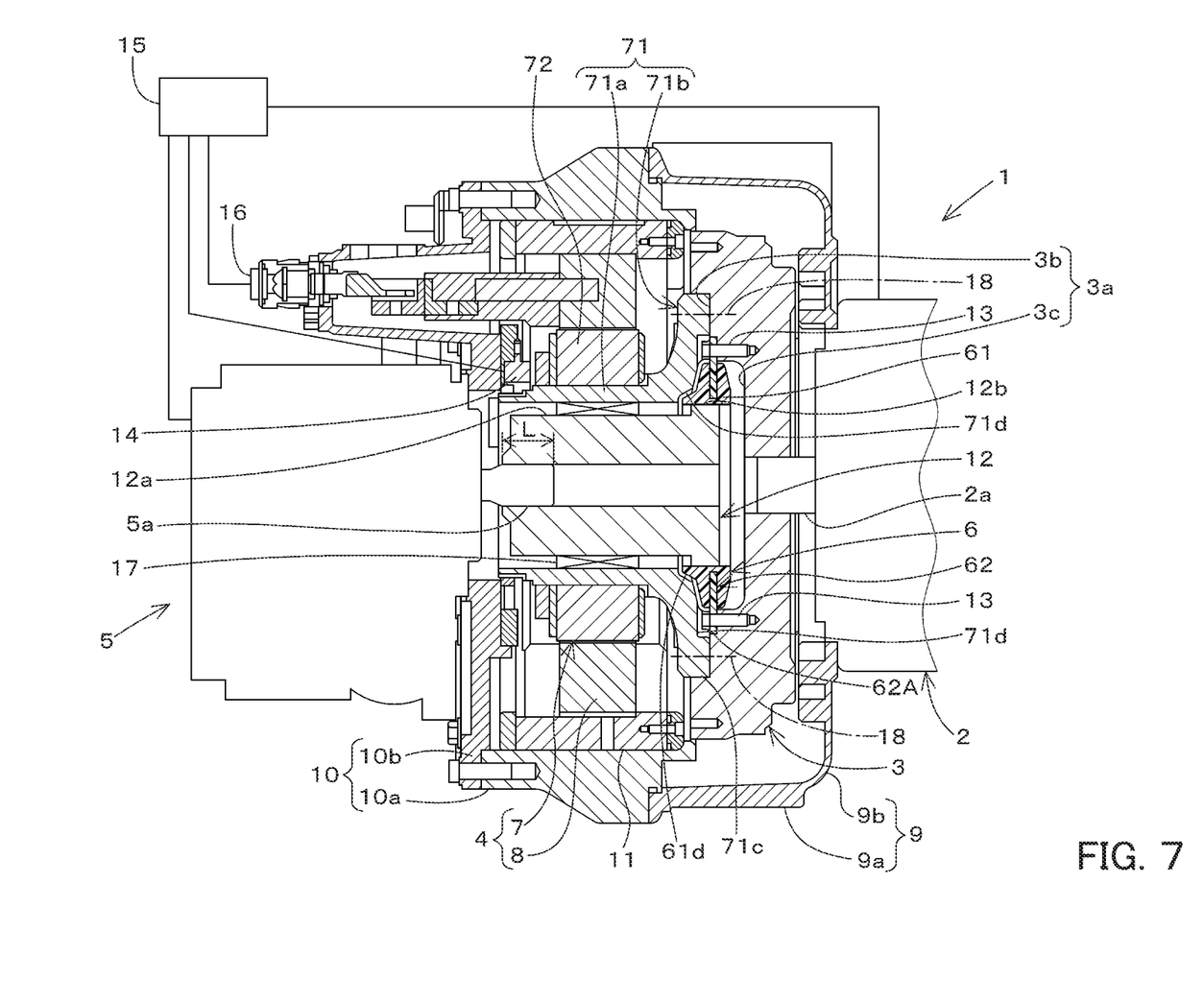
FIG. 7 is a cross-sectional view illustrating another parallel hybrid power transmission mechanism according to another embodiment of the present embodiment.

FIG. 7 shows another embodiment of the power transmission mechanism 1.

As shown in FIG. 7, an intermediate bearing 17 may be arranged in a gap between the outer circumferential surface of the small diameter portion 12a of the intermediate shaft 12 and the inner circumferential surface of the rotor boss 71. A needle bearing or the like is employed as the intermediate bearing 17, for example. The intermediate bearing 17 supports the rotor 7 rotatably with respect to the intermediate shaft 12. In this manner, the intermediate shaft 12 and the rotor 7 are mutually supported to prevent the resonance. Then, the rotor 7 is supported by the intermediate bearing 17 rotatably with respect to the intermediate shaft 12 with high rotational accuracy, and thereby the rotation accuracy of the rotor 7 is maintained high. Thus, the air gap between the rotor 7 and the stator 8 is prevented from fluctuating depending on the rotations of the rotor 7. In addition, it is also possible to suppress variations in the air gap between the rotor 7 and the stator of the rotation detector 14 such as a resolver.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims. For example, the large diameter concave portion (the annular concave portion) 3b of the flywheel 3 and the flange portion 71b of the rotor boss 71 may be connected with an elastic body or a coupling interposed therebetween.

What is claimed is:

1. A parallel hybrid power transmission mechanism comprising:
    an engine;
    a crank shaft disposed on the engine;
    a motor generator;
    a driven device to which a power of the engine and/or the motor generator is transmitted;
    an input shaft disposed on the driven device;
    a flywheel connected to the crank shaft and configured to be rotated;
    a rotor disposed on the motor generator, including
        a first connecting portion connected to an outside of the flywheel in a radial direction, the rotor being configured to supply and receive a rotational power to and from the flywheel through the first connecting portion;
    a coupling arranged independently from the rotor, including
        a second connecting portion connected to an inside of the flywheel in the radial direction, the coupling being configured to receive the rotational power of the flywheel through the second connecting portion; and
    an intermediate shaft connecting the coupling and the input shaft to each other, the intermediate shaft being configured to transmit the rotational power received by the coupling to the input shaft,
    wherein the rotor has a rotor boss having a hollow shape, the rotor boss being arranged on an outside of the intermediate shaft in the radial direction,
    wherein the coupling is arranged on the outside of the intermediate shaft in the radial direction between the rotor boss and the flywheel,
    wherein the flywheel has a first concave portion on the rotor boss side,
    wherein the rotor boss has a second concave portion on the flywheel side, and
    wherein the hub of the coupling is arranged between the first concave portion and the second concave portion.

2. The parallel hybrid power transmission mechanism according to claim 1,
    wherein the coupling includes:
        a hub formed of flexible material and connected to the intermediate shaft; and
        a disk formed of rigid material, the disk protruding from the hub outwardly in the radial direction and including the second connecting portion connected to the flywheel.

3. The parallel hybrid power transmission mechanism according to claim 1,
    wherein the coupling includes:
        a hub formed of flexible material and connected to the intermediate shaft; and
        a disk formed of flexible material, the disk protruding from the hub outwardly in the radial direction and including the second connecting portion connected to the flywheel.

4. The parallel hybrid power transmission mechanism according to claim 1, wherein a hub has a projecting portion projecting toward the rotor boss side and projecting gradually higher on an inner side in the radial direction, and
    wherein the projecting portion is arranged in the second concave portion.

5. The parallel hybrid power transmission mechanism according to claim 1, comprising:
    a flywheel housing surrounding the flywheel;
    a motor housing having an inner space and surrounding the motor generator, the motor housing being connected to the flywheel housing with the inner space opposed to the flywheel housing; and
    a flange portion formed on an end portion of the rotor boss, the flange portion protruding in the radial direction and including the first connecting portion,
    wherein the first concave portion includes
        an annular concave portion to which an outer circumference of the coupling is attached,
    and wherein the flange portion is connected to the annular concave portion.

6. The parallel hybrid power transmission mechanism according to claim 1, comprising
    an intermediate bearing configured to support the rotor boss rotatably on the intermediate shaft, wherein the intermediate shaft is connected to the flywheel by the coupling.

7. The parallel hybrid power transmission mechanism according to claim 1, comprising
a rotation detector configured to detect a rotation phase of the rotor.

8. The parallel hybrid power transmission mechanism according to claim 1, wherein when the power of the engine is transmitted to the driven device, the motor generator performs a function as a motor to assist the power of the engine, and the rotor being configured to add the rotational power in addition to that of the engine.

9. A parallel hybrid power transmission mechanism comprising:
an engine;
a crank shaft disposed on the engine;
a motor generator;
a driven device to which a power of the engine and/or the motor generator is transmitted;
an input shaft disposed on the driven device;
a flywheel connected to the crank shaft and configured to be rotated;
a rotor disposed on the motor generator, including
a first connecting portion connected to an outside of the flywheel in a radial direction, the rotor being configured to supply and receive a rotational power to and from the flywheel through the first connecting portion;
a coupling arranged independently from the rotor, including
a second connecting portion connected to an inside of the flywheel in the radial direction, the coupling being configured to receive the rotational power of the flywheel through the second connecting portion;
an intermediate shaft connecting the coupling and the input shaft to each other, the intermediate shaft being configured to transmit the rotational power received by the coupling to the input shaft; and
a rotation detector configured to detect a rotation phase of the rotor.

* * * * *